(12) United States Patent
Tang

(10) Patent No.: US 7,660,049 B2
(45) Date of Patent: Feb. 9, 2010

(54) OPTICAL LENS SYSTEM FOR TAKING IMAGE

(75) Inventor: Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 286 days.

(21) Appl. No.: 11/871,963

(22) Filed: Oct. 12, 2007

(65) Prior Publication Data
US 2008/0266678 A1    Oct. 30, 2008

(30) Foreign Application Priority Data
Apr. 25, 2007    (TW)    ............... 96114685 A

(51) Int. Cl.
G02B 9/34    (2006.01)
G02B 3/02    (2006.01)
(52) U.S. Cl. ...................... 359/781; 359/715
(58) Field of Classification Search .............. 359/708, 359/715, 761, 770, 771, 781
See application file for complete search history.

(56) References Cited

U.S. PATENT DOCUMENTS 7,095,570 B2 *    8/2006    Amanai ................ 359/781

* cited by examiner

Primary Examiner—Jack Dinh
(74) Attorney, Agent, or Firm—Banger Shia

(57) ABSTRACT

An optical lens system for taking image comprises four lens elements with refractive power, from the object side to the image side: a first meniscus lens element with negative refractive power; a second lens element with positive refractive power having a convex object-side and a convex image-side surface; a third lens element with negative refractive power having a concave object-side surface and a convex image-side surface; a fourth lens element with positive refractive power having a convex object-side surface and a concave image-side surface; and an aperture stop located between the object and the second lens element. The above arrangements effectively reduce the volume of the optical lens system while providing a relatively high resolution.

14 Claims, 8 Drawing Sheets

OPTICAL LENS SYSTEM FOR TAKING IMAGE

BACKGROUND OF THE INVENTION

1. Field of the Invention

The present invention relates to an optical lens system for taking image, and more particularly to an optical lens system for taking image used in a mobile phone camera.

2. Description of the Prior Art

In recent years, with the popularity of mobile phone camera, the optical lens system for taking image has been becoming thinner and thinner, and the sensor of a general digital camera is none other than CCD (Charge Coupled Device) or CMOS (Complementary Metal Oxide Semiconductor). Due to advances in semiconductor manufacturing, the pixel size of sensors has been reduced continuously, and miniaturized optical lens systems for taking image have increasingly higher resolution. Therefore, the demand for image quality is increasing.

A conventional high resolution mobile phone camera usually takes the form of "front aperture stop", and this kind of mobile phone camera generally requires four lens elements for high resolution: the first and second lens elements are usually two glass lens elements with a spherical surface that are glued to each other to form a Doublet for eliminating chromatic aberration. However, this method has the following disadvantages:

First, the arrangement of too many spherical lens elements reduces the degree of freedom of the optical system, as a result, reducing the length of the whole optical system is difficult.

Second, the gluing process of the glass lens elements is difficult to control.

The present invention mitigates and/or obviates the afore-described disadvantages.

SUMMARY OF THE INVENTION

To improve the image quality of the optical system and effectively reduce the size of the optical lens system, the present invention provides a whole new four-lens type optical lens system, which comprises four lens elements with refractive power, from the object side to the image side:

a first meniscus lens element with negative refractive power;

a second lens element with positive refractive power having a convex object-side and a convex image-side surface;

a third lens element with negative refractive power having a concave object-side surface and a convex image-side surface;

a fourth lens element with positive refractive power having a convex object-side surface and a concave image-side surface; and an aperture stop located between the object and the second lens element.

In the present optical lens system for taking image, the meniscus first lens element with negative refractive power can effectively broaden the field of view of the optical system for taking image. The refractive power of the optical lens system for taking image of the present invention is mainly provided by the second lens element with positive refractive power. The third lens element with negative refractive power is used to correct the chromatic aberration caused by the optical system, and the fourth lens element with positive refractive power serves to balance and correct the various aberrations caused by the system.

In the present optical lens system for taking image, the object-side surface and the image-side surface of the second lens element with positive refractive power are both convex. The object-side surface and the image-side surface of the third lens element with negative refractive power are concave and convex respectively. The object-side surface and the image-side surface of the fourth lens element with positive refractive power are convex and concave respectively. And the object-side of the first meniscus lens element with negative refractive power can be convex or concave. Such arrangements can effectively correct the aberrations of the optical lens system, and thus the image quality can be improved effectively.

The second lens element provides a strong positive refractive power, and the aperture stop is located close to the object side, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading. And the inflection point is formed on the fourth lens element to contribute to a better correction of the incident angle of the off axis light with respect to the sensor. For a wide-angle optical system, the correction to the distortion and the chromatic aberration of magnification is very important, and the correction is made by arranging the aperture stop at a balanced position of the refractive power of the optical system. The aperture stop of the optical lens system of the present invention is arranged between the first lens element and the second lens element, so as to achieve a balance between the properties of telecentric and wide field of view. And if the aperture stop is located in front of the first lens element, the optical lens system will emphasize the telecentric property.

With the miniaturization of the optical lens system and the requirement of a large field of view, the focal length of the optical lens system is becoming very short. Therefore, the radius of curvature and the size of the lens elements must be very small, and it is impossible to make such glass lens elements by conventional grind method. Plastic material is introduced to make lens elements by injection molding, using a relatively low cost to produce high precision lens elements. The surfaces of lens element are aspheric, allowing more design parameters (than spherical surfaces), so as to better reduce the aberration and the number of the lens elements, so that the length of the optical lens system can be reduced effectively.

In the present optical lens system for taking image, an Abbe number of the third lens element is V3, and it satisfies the relation:

$V3<32.$

The above relation can effectively correct the chromatic aberration caused by the system, and improve the resolution of the optical lens system for taking image. And it will be better if the Abbe number V3 of the third lens element satisfies the relation:

$V3<28.$

Further, it will be much better if the Abbe number b of the third lens element satisfies the relation:

$V3<25.$

In the present optical lens system for taking image, the Abbe number of the first lens element is V1, the Abbe number of the third lens element is V3, and they satisfy the relation:

$|V1-V3|>3.$

If the above relation is satisfied with appropriate material selection, the chromatic aberration caused by the optical system can be improved. And it will be better if $|V1-V3|$ satisfies the relation:

$|V1-V3|>15.$

In the present optical lens system for taking image, the focal length of the first lens element is f1, the focal length of the optical lens system is f, and they satisfy the relation:

$$-0.5 < f/f1 < -0.1.$$

If the value of f/f1 is smaller than the above lower limit, the total track length of the optical lens system will be too long, and it will be difficult to suppress the incident angle of the light with respect to the sensor. And if the value of f/f1 is greater than the above upper limit, the field of view of the optical lens system for taking image will be reduced.

In the present optical lens system for taking image, the focal length of the second lens element is f2, the focal length of the optical lens system is f, and they satisfy the relation:

$$1.65 < f/f2 < 2.2.$$

Increasing the refractive power of the second lens element can reduce the total track length of the optical lens system and effectively reduce the incident angle of the light with respect to the sensor. In order to correct the high order aberrations and make the optical lens system produce enough back focal length, the refractive power of the second lens element should be lower than the above upper limit. For further miniaturizing the optical lens system for taking image, it would be better if the value of f/f2 satisfies the relation:

$$2.0 < f/f2 < 2.5.$$

In the present optical lens system for taking image, the focal length of the third lens element is f3, the focal length of the optical lens system is f, and they satisfy the relation:

$$-1.8 < f/f3 < -1.6.$$

If the value of f/f3 is greater than the above upper limit, it will be difficult to correct the chromatic aberration caused by the optical lens system. If the value of f/f3 is lower than the above lower limit, the total track length of the optical lens system for taking image will be too long.

In the present optical lens system for taking image, the radius of curvature of the object-side surface of the second lens element is R3, the radius of curvature of the image-side surface of the second lens element is R4, and they satisfy the relation:

$$-2.0 < R3/R4 < -1.0.$$

If the value of R3/R4 is lower than the low limit as stated above, the absolute value of R4 will be relatively small, and it will be difficult to correct the aberration caused by the optical lens system. On the other hand, if the value of R3/R4 is higher than the above upper limit, the absolute value of R4 will be relatively large, the refractive power of the image-side surface of the second lens element will be reduced. This requires moving the aperture stop forward to reduce the incident angle of the off axis light with respect to the sensor, and this will be counter to the objective of miniaturization of the optical lens system for taking image.

In the present optical lens system for taking image, the radius of curvature of the object-side surface of the third lens element is R5, the radius of curvature of the image-side surface of the third lens element is R6, and they satisfy the relation:

$$0.2 < R5/R6 < 0.4.$$

If the value of R5/R6 is lower than the lower limit as stated above, the absolute value of R5 will be relatively small, the total track length of the optical lens system will be too long. On the other hand, if the value of R5/R6 is higher than the above upper limit, the absolute value of R5 will be relatively large, and it will be difficult to correct the chromatic aberration caused by the optical lens system. And it will be better if the value of R5/R6 satisfies the relation below:

$$0.2 < R5/R6 < 0.3.$$

In the present thin-type optical lens system for taking image, the center thickness of the second lens element is CT2, the edge thickness of the second lens element is ET2, and they satisfy the relation:

$$2.0 < CT2/ET2 < 2.5.$$

The edge thickness is: the length projected on the optical axis by the distance between the positions of the effective diameter of the front and the rear surfaces of the lens.

If the value of CT2/ET2 is smaller than the above lower limit, the refractive power of the optical lens system for taking image will be weak, and if the value of CT2/ET2 is greater than the above upper limit, it will cause lenses made from plastic injection molding to have poor material uniformity.

DETAILED DESCRIPTION OF THE PREFERRED EMBODIMENTS

Figure 1:
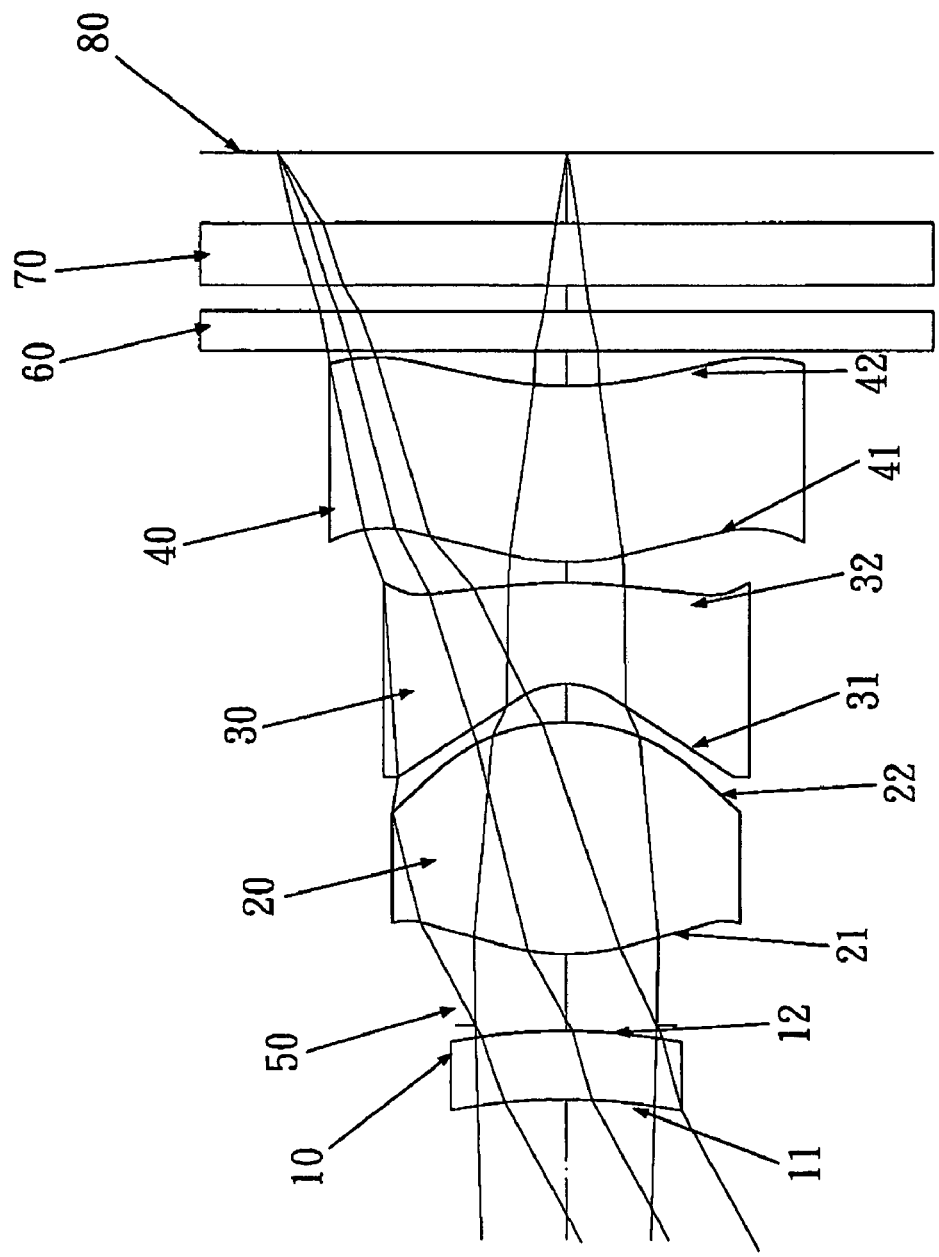
FIG. 1 shows an optical lens system for taking image in accordance with a first embodiment of the present invention.
Figure 2:
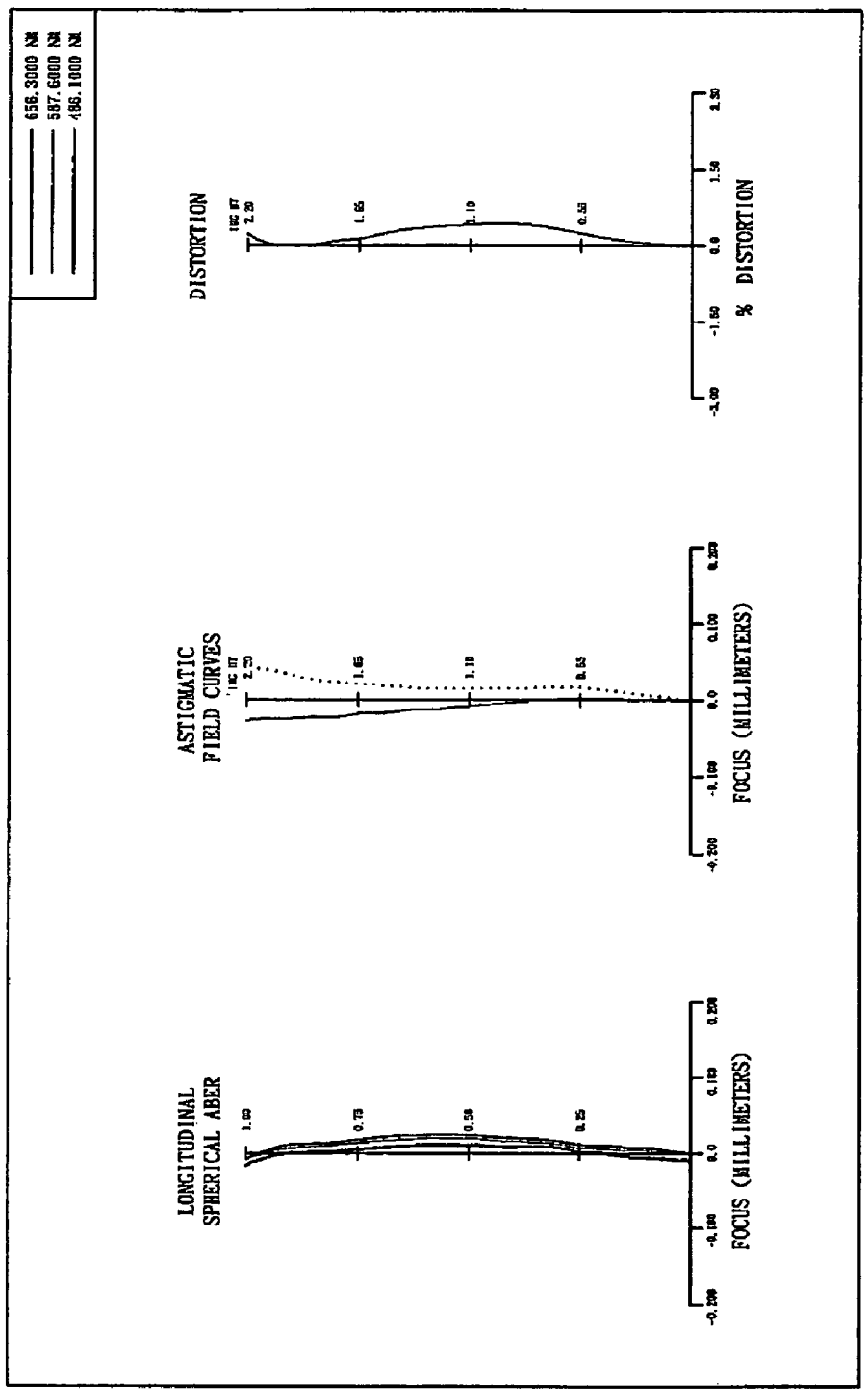
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. The first embodiment of the present invention is an optical lens system for taking image comprising four lens elements with refractive power, and the optical lens system for taking image comprises: from the object side to the image side:

A plastic first lens element 10 with negative refractive power has a concave object-side surface 11 and a convex image-side surface 12, and the object-side surface 11 and the image-side surface 12 of the first lens element 10 are aspheric.

A plastic second lens element 20 with positive refractive power has a convex object-side surface 21 and a convex image-side surface 22, the object-side surface 21 and the image-side surface 22 of the second lens element 20 are aspheric.

A plastic third lens element 30 with negative refractive power has a concave object-side surface 31 and a convex image-side surface 32, the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on each of the object-side surface 41 and the image-side surface 42.

An aperture stop 50 is located between the first lens element 10 and the second lens element 20.

An IR cut filter 60 is located behind the fourth lens element 40 and has no influence on the focal length of the optical lens system.

A sensor cover glass 70 is located behind the IR cut filter 60 and has no influence on the focal length of the optical lens system.

The image plane 80 is located behind the sensor cover glass 70.

The equation of the curve of the aspheric surfaces is expressed as follows:

$$X(Y) = (Y^2/R)/(1 + sqrt(1 - (1+k)*(Y/R)^2)) + \sum_{i=1}^{20} (Ai)*(Y^i)$$

wherein:

X: the depth from a point on the aspheric lens surface at a distance Y from the optical axis to the tangential plane of the aspheric surface vertex;

Y: the distance from the point on the curve of the aspheric surface to the optical axis;

K: the conic coefficient;

Ai: the ith aspheric coefficient.

In the first embodiment of the present optical lens system for taking image, the Abbe number of the first lens element is V1, the Abbe number of the third lens element is V3, and they satisfy the relations:

$V3=30.2$ $|V1-V3|=25.6$.

In the first embodiment of the present optical lens system for taking image, the focal length of the first lens element is f1, the focal length of the second lens element is f2, the focal length of the third lens element is f3, the focal length of the optical lens system for taking image is f, and they satisfy the relations:

$f/f1=-0.21$ $f/f2=2.05$ $f/f3=-2.3$.

In the first embodiment of the present optical lens system for taking image, the center thickness of the second lens element is CT2, the edge thickness of the second lens element is ET2, and they satisfy the relation:

$CT2/ET2=2.08$.

The edge thickness is: the length projected on an optical axis by the distance between the positions of the effective diameter of the front and the rear surfaces of the lens.

In the first embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and they satisfy the relations:

$R3/R4=-1.38$ $R5/R6=0.24$.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 3.80 mm, Fno = 2.8, HFOV (half of field of view) = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −8.87130(ASP) | 0.500 | Plastic | 1.530 | 55.8 | −18.4 |
| 2 | | −100.00000(ASP) | 0.070 | | | | |
| 3 | Aperture Stop | Plano | 0.531 | | | | |
| 4 | Lens 2 | 1.95423(ASP) | 1.700 | Plastic | 1.543 | 60.3 | 1.84 |
| 5 | | −1.42028(ASP) | 0.297 | | | | |
| 6 | Lens 3 | −0.62629(ASP) | 0.747 | Plastic | 1.583 | 30.2 | −1.63 |
| 7 | | −2.63628(ASP) | 0.143 | | | | |
| 8 | Lens 4 | 1.59982(ASP) | 1.321 | Plastic | 1.530 | 55.8 | 4.06 |
| 9 | | 4.45200(ASP) | 0.200 | | | | |
| 10 | IR-filter | Plano | 0.300 | Glass | 1.517 | 64.1 | — |
| 11 | | Plano | 0.200 | | | | |
| 12 | Cover Glass | Plano | 0.460 | Glass | 1.517 | 64.1 | — |
| 13 | | Plano | 0.534 | | | | |
| 14 | Image | Plano | | | | | |

TABLE 2

Aspheric Coefficients

| Surface # | 1 | 2 | 4 | 5 |
|---|---|---|---|---|
| K= | −1.00272E+00 | −2.50000E+02 | −6.13815E−01 | −5.06517E−01 |
| A4= | −6.10332E−02 | −1.09537E−01 | −6.58492E−02 | 4.28702E−02 |

TABLE 2-continued

Aspheric Coefficients

| A6= | 3.23040E−02 | 3.17358E−02 | 2.83702E−02 | −2.62576E−02 |
|---|---|---|---|---|
| A8= | −5.13282E−02 | 3.30506E−02 | −3.30825E−02 | 3.00165E−03 |
| A10= | 6.18713E−02 | −4.09328E−02 | 8.67344E−03 | 4.77652E−03 |
| A12= | −1.37529E−02 | −5.30121E−05 | −9.79206E−04 | −1.34567E−03 |
| A14= | −1.68608E−02 | | | |

| Surface # | 6 | 7 | 8 | 9 |
|---|---|---|---|---|
| K= | −2.06646E+00 | 6.50119E−01 | −6.75145E+00 | 2.81722E+00 |
| A4= | 4.61575E−02 | 8.95925E−02 | −2.31574E−02 | −1.28213E−02 |
| A6= | −2.32015E−02 | −1.26279E−03 | −5.40945E−03 | −1.23486E−02 |
| A8= | −3.31102E−03 | −6.38942E−04 | 6.21351DE−04 | 3.45210E−03 |
| A10= | 1.34839E−02 | 6.42693E−04 | 3.30465E−04 | −4.30096E−04 |
| A12= | −3.40218E−03 | −9.31180E−05 | −1.03742E−04 | 1.54635E−05 |

Figure 3:
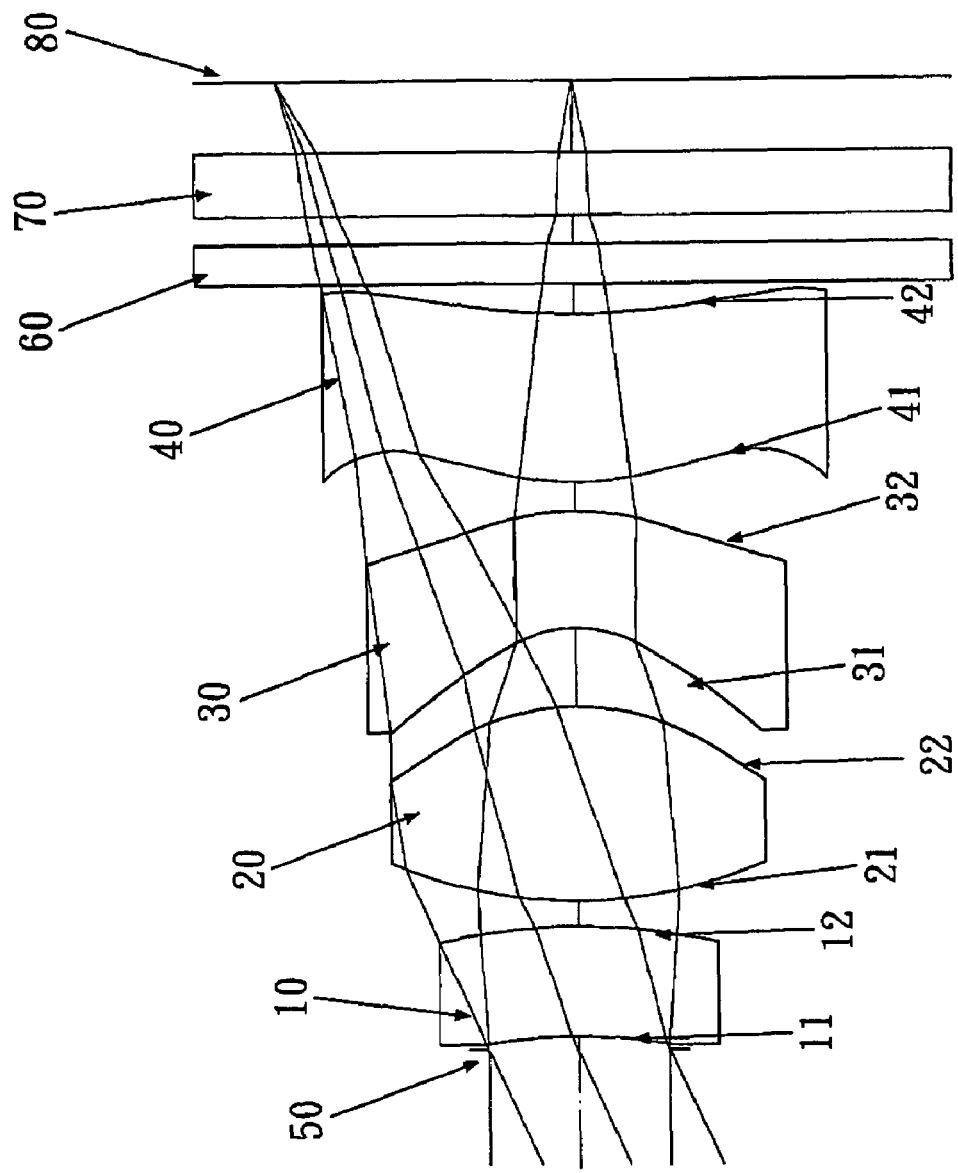
FIG. 3 shows an optical lens system for taking image in accordance with a second embodiment of the present invention.
Figure 4:
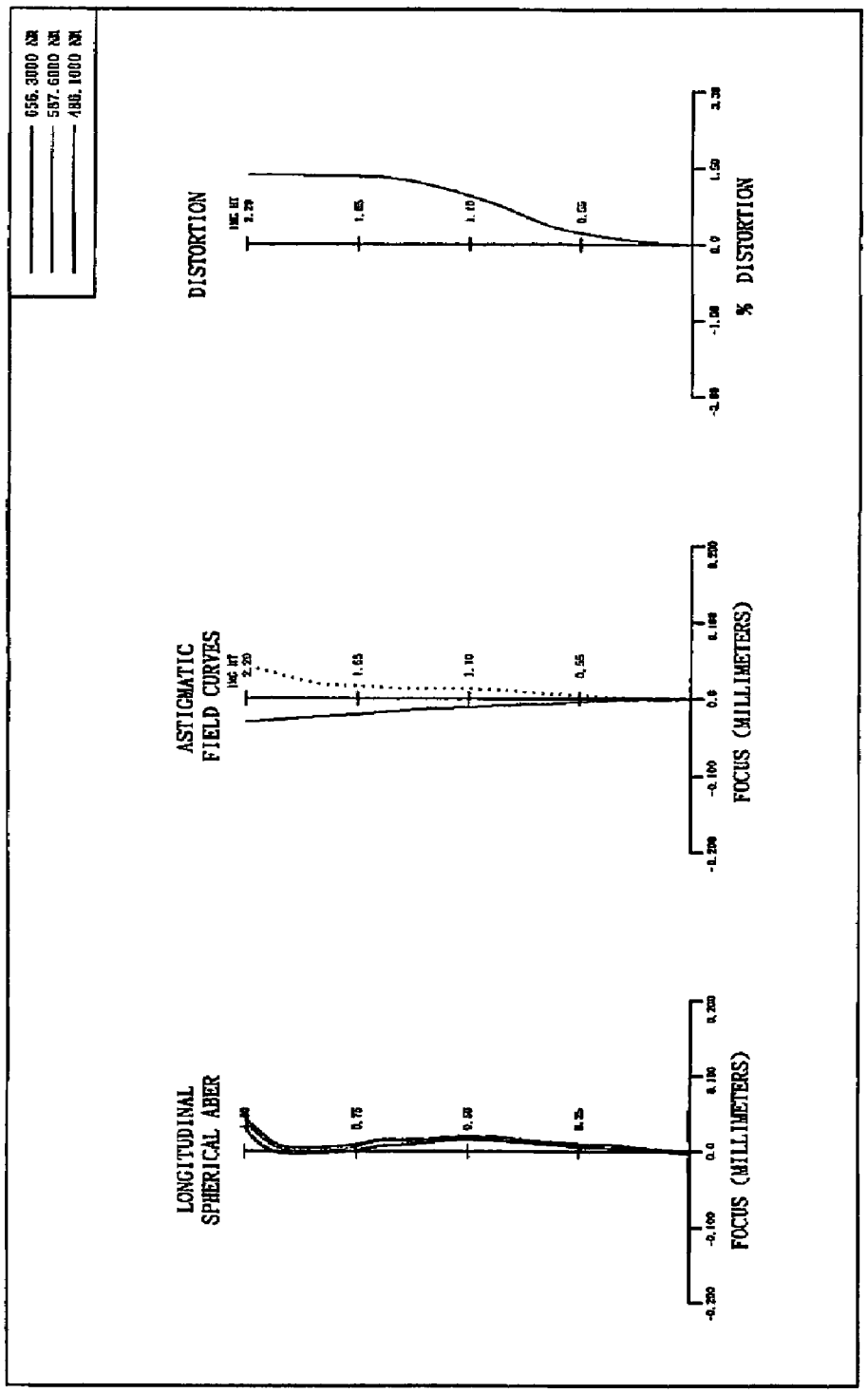
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention is an optical lens system for taking image comprising four lens elements with refractive power, and the optical lens system for taking image comprises: from the object side to the image side:

A plastic first lens element 10 with negative refractive power has a concave object-side surface 11 and a convex image-side surface 12, and the object-side surface 11 and the image-side surface 12 of the first lens element 10 are aspheric.

A plastic second lens element 20 with positive refractive power has a convex object-side surface 21 and a convex image-side surface 22, the object-side surface 21 and the image-side surface 22 of the second lens element 20 are aspheric.

A plastic third lens element 30 with negative refractive power has a concave object-side surface 31 and a convex image-side surface 32, the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on each of the object-side surface 41 and the image-side surface 42.

An aperture stop 50 is located in front of the first lens element 10.

An IR, cut filter 60 is located behind the fourth lens element 40 and has no influence on the focal length of the optical lens system.

A sensor cover glass 70 is located behind the IR cut filter 60 and has no influence on the focal length of the optical lens system.

The image plane 80 is located behind the sensor cover glass 70.

The equation of the curve of the aspheric surfaces of the second embodiment has the same form as that of the first embodiment.

In the second embodiment of the present optical lens system for taking image, the Abbe number of the first lens element is V1, the Abbe number of the third lens element is V3, and they satisfy the relations:

$$V3=23.4$$

$$|V1-V3|=32.4.$$

In the second embodiment of the present optical lens system for talking image, the focal length of the first lens element is f1, the focal length of the second lens element is f2, the focal length of the third lens element is f3, the focal length of the optical lens system for taking image is f, and they satisfy the relations:

$$f/f1=-0.14$$

$$f/f2=1.77$$

$$f/f3=-1.68.$$

In the second embodiment of the present optical lens system for taking image, the center thickness of the second lens element is CT2, the edge thickness of the second lens element is ET2, and they satisfy the relation:

$$CT2/ET2=2.21.$$

The definition of the edge thickness of the second embodiment is the same as that of the first embodiment.

In the second embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and they satisfy the relations:

$$R3/R4=-1.53$$

$$R5/R6=0.34.$$

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 3.78 mm, Fno = 2.8, HFOV (half of field of view) = 29.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | 0.092 | | | | |
| 2 | Lens 1 | −4.34780(ASP) | 0.797 | Plastic | 1.530 | 55.8 | −27.56 |
| 3 | | −6.58390(ASP) | 0.180 | | | | |
| 4 | Lens 2 | 2.57262(ASP) | 1.427 | Plastic | 1.543 | 60.3 | 2.13 |
| 5 | | −1.68617(ASP) | 0.593 | | | | |
| 6 | Lens 3 | −0.72662(ASP) | 0.850 | Plastic | 1.632 | 23.4 | −2.24 |
| 7 | | −2.16696(ASP) | 0.222 | | | | |
| 8 | Lens 4 | 1.96468(ASP) | 1.222 | Plastic | 1.530 | 55.8 | 4.93 |
| 9 | | 6.21260(ASP) | 0.200 | | | | |
| 10 | IR-filter | Plano | 0.300 | Glass | 1.517 | 64.1 | — |
| 11 | | Plano | 0.200 | | | | |
| 12 | Cover Glass | Plano | 0.460 | Glass | 1.517 | 64.1 | — |
| 13 | | Plano | 0.535 | | | | |
| 14 | Image | Plano | | | | | |

TABLE 4

Aspheric Coefficients

| Surface # | 1 | 2 | 4 | 5 |
|---|---|---|---|---|
| K= | −2.22160E+01 | −9.17731E+01 | −6.97593E−01 | −4.49737E−01 |
| A4= | −6.38370E−02 | −1.12011E−01 | −6.70029E−02 | 3.76165E−02 |
| A6= | 8.76703E−03 | 6.70611E−02 | 5.42589E−02 | −1.97742E−02 |
| A8= | 6.69761E−02 | 2.87228E−02 | −2.31240E−02 | 4.07701E−03 |
| A10= | −8.78506E−02 | −4.21448E−02 | 5.06634E−03 | 4.36812E−03 |
| A12= | −2.05119E−02 | −7.33605E−06 | −1.11669E−03 | −1.20156E−03 |
| A14= | −3.13901E−02 | | | |

| Surface # | 6 | 7 | 8 | 9 |
|---|---|---|---|---|
| K= | −1.96384E+00 | 4.98304E−01 | −5.65084E+00 | 6.45873E+00 |
| A4= | 2.75024E−02 | 5.46197E−02 | −2.01480E−02 | 1.24568E−02 |
| A6= | −2.49888E−02 | −1.06847E−03 | −4.70977E−03 | −1.72394E−02 |
| A8= | −1.76715E−03 | −9.26261E−04 | −9.82578E−04 | 3.57220E−03 |
| A10= | 1.35904E−02 | 5.59796E−04 | 6.42515E−05 | −3.55572E−04 |
| A12= | −3.53214E−03 | 2.44001E−04 | 1.54582E−05 | 8.18261E−06 |

Figure 5:
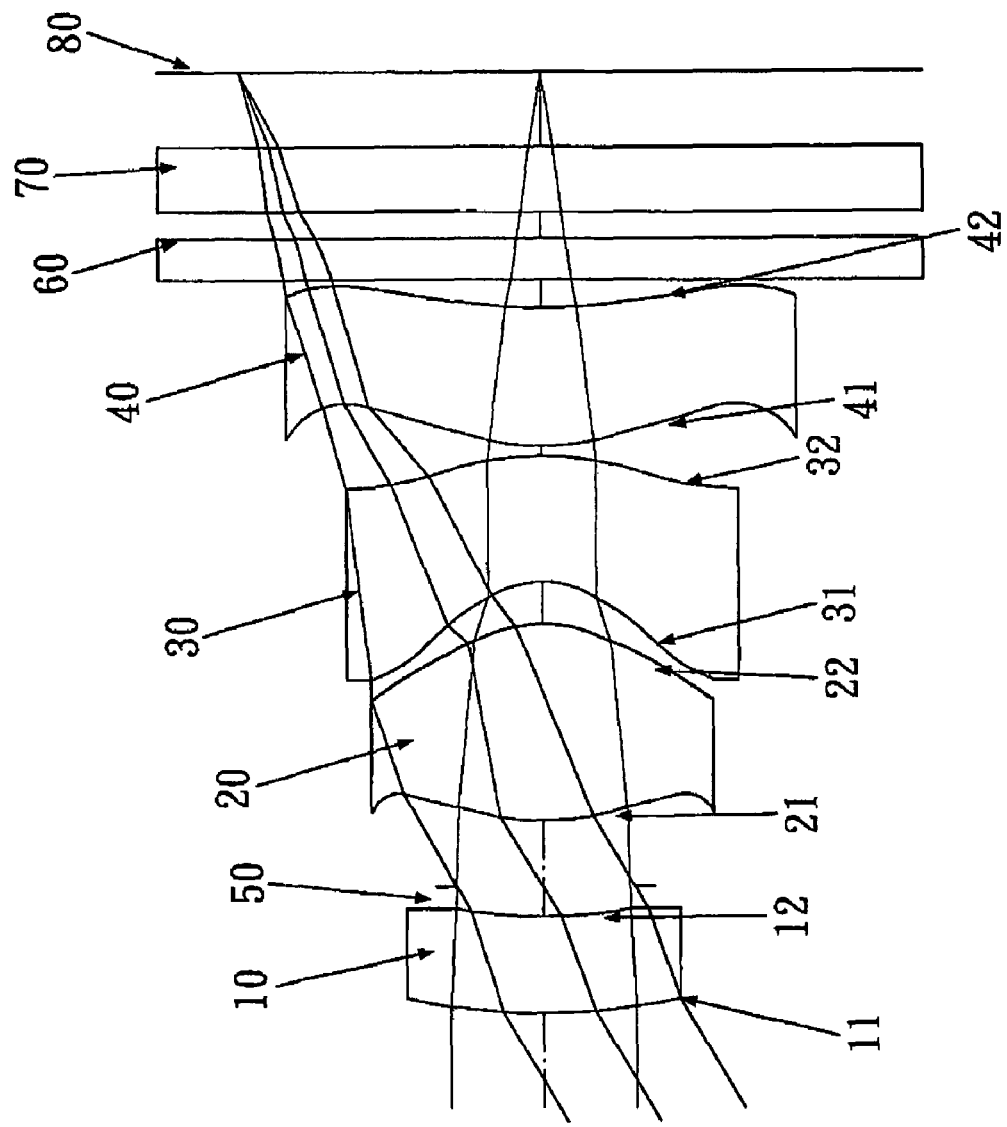
FIG. 5 shows an optical lens system for taking image in accordance with a third embodiment of the present invention.
Figure 6:
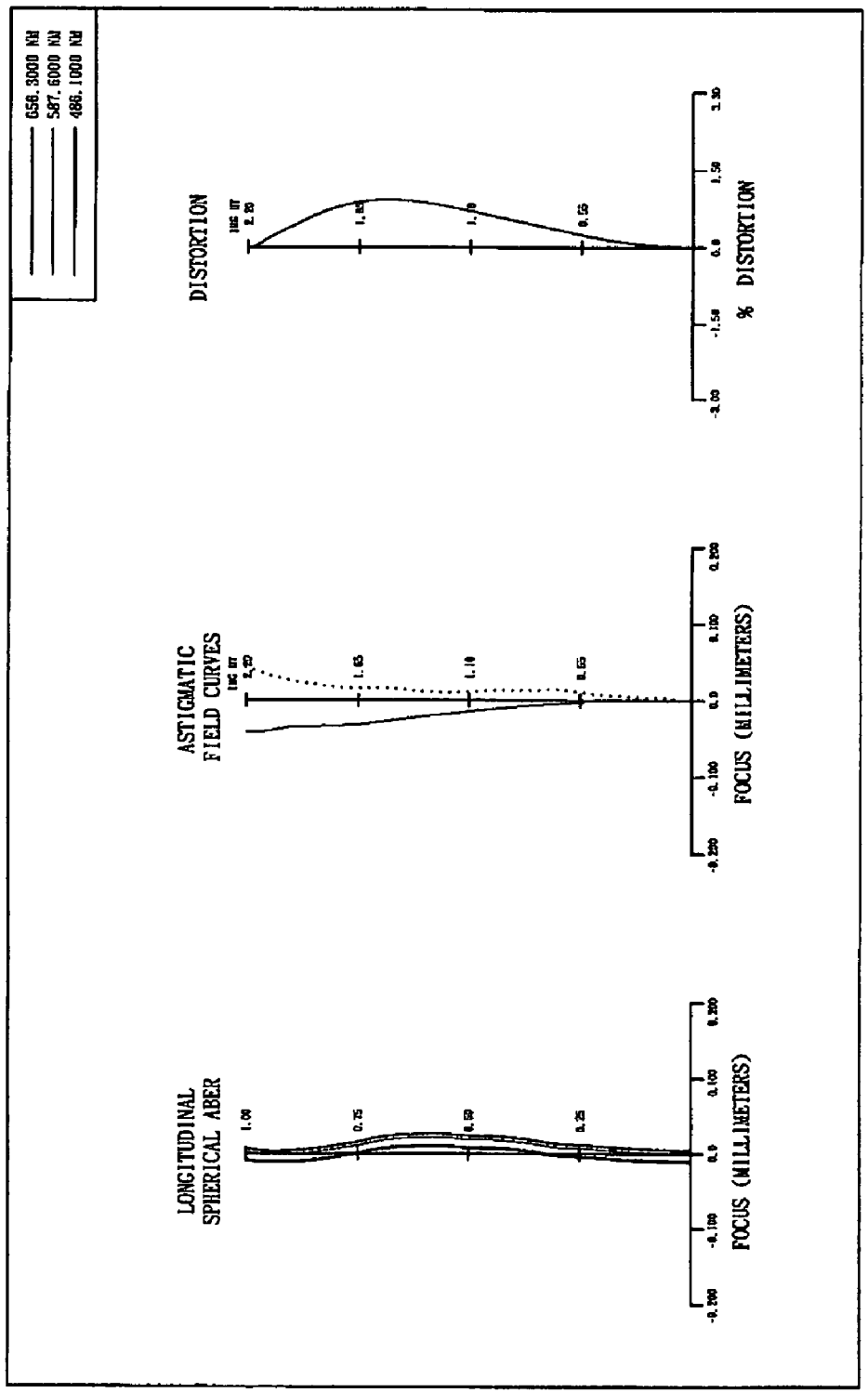
FIG. 6 shows the aberration curve of the third embodiment of the present invention.

Referring to FIG. 5, which shows an optical lens system for taking image in accordance with a third embodiment of the present invention, and FIG. 6 shows the aberration curve of the third embodiment of the present invention. The third embodiment of the present invention is an optical lens system for taking image comprising four lens elements with refractive power, and the optical lens system for taking image comprises: from the object side to the image side:

A plastic first lens element 10 with negative refractive power has a convex object-side surface 11 and a concave image-side surface 12, and the object-side surface 11 and the image-side surface 12 of the first lens element 10 are aspheric.

A plastic second lens element 20 with positive refractive power has a convex object-side surface 21 and a convex image-side surface 22, the object-side surface 21 and the image-side surface 22 of the second lens element 20 are aspheric.

A plastic third lens element 30 with negative refractive power has a concave object-side surface 31 and a convex image-side surface 32, the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on each of the object-side surface 41 and the image-side surface 42.

An aperture stop 50 is located between the first lens element 10 and the second lens element 20.

An IR cut filter 60 is located behind the fourth lens element 40 and has no influence on the focal length of the optical lens system.

A sensor cover glass 70 is located behind the IR cut filter 60 and has no influence on the focal length of the optical lens system.

The image plane 80 is located behind the sensor cover glass 70.

The equation of the curve of the aspheric surfaces of the third embodiment has the same form as that of the first embodiment.

In the third embodiment of the present optical lens system for taking image, the Abbe number of the first lens element is V1, the Abbe number of the third lens element is V3, and they satisfy the relations:

$V3 = 30.2$ $|V1 - V3| = 30.1.$

In the third embodiment of the present optical lens system for taking image, the focal length of the first lens element is f1, the focal length of the second lens element is f2, the focal length of the third lens element is f3, the focal length of the optical lens system for taking image is f, and they satisfy the relations:

$f/f1 = -0.01$ $f/f2 = 2.10$ $f/f3 = -2.22$.

In the third embodiment of the present optical lens system for taking image, the center thickness of the second lens element is CT2, the edge thickness of the second lens element is ET2, and they satisfy the relation:

$CT2/ET2 = 2.13$.

The definition of the edge thickness of the third embodiment is the same as that of the first embodiment.

In the third embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and they satisfy the relations:

$R3/R4 = -1.46$ $R5/R6 = 0.27$.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f(focal length) = 3.80 mm, Fno = 2.8, HFOV (half of field of view) = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.30410(ASP) | 0.700 | Plastic | 1.543 | 60.3 | −1124.49 |
| 2 | | 3.04120(ASP) | 0231 | | | | |
| 3 | Aperture Stop | Plano | 0.452 | | | | |
| 4 | Lens 2 | 2.07066(ASP) | 1.403 | Plastic | 1.543 | 60.3 | 1.80 |
| 5 | | −1.41535(ASP) | 0.309 | | | | |
| 6 | Lens 3 | −0.57562(ASP) | 0.886 | Plastic | 1.583 | 30.2 | −1.71 |
| 7 | | −2.13746(ASP) | 0.070 | | | | |
| 8 | Lens 4 | 1.59846(ASP) | 0.985 | Plastic | 1.530 | 55.8 | 3.93 |
| 9 | | 5.38630(ASP) | 0.200 | | | | |
| 10 | IR-filter | Plano | 0.300 | Glass | 1.517 | 64.1 | — |
| 11 | | Plano | 0.200 | | | | |
| 12 | Cover Glass | Plano | 0.460 | Glass | 1.517 | 64.1 | — |
| 13 | | Plano | 0.534 | | | | |
| 14 | Image | Plano | | | | | |

TABLE 6

Aspheric Coefficients

| Surface # | 1 | 2 | 4 | 5 |
|---|---|---|---|---|
| K= | −7.73941E+00 | −8.84534E+00 | 1.94953E−01 | −7.31540E−01 |
| A4= | −1.56182E−02 | −4.45551E−02 | −5.12086E−02 | 4.43508E−02 |
| A6= | −4.94056E−03 | −2.24469E−02 | 1.90356E−02 | −6.37391E−03 |
| A8= | −1.23469E−02 | −3.07086E−02 | −4.59996E−02 | −9.84126E−03 |
| A10= | 8.22491E−03 | 6.83881E−02 | 2.86380E−02 | 1.90477E−03 |
| A12= | — | — | −2.06158E−02 | — |

| Surface # | 6 | 7 | 8 | 9 |
|---|---|---|---|---|
| K= | −1.76790E+00 | 3.65132E−01 | −5.49916E+00 | −4.28205E−01 |
| A4= | 6.91069E−02 | 7.90788E−02 | −4.46691E−03 | 1.24885E−02 |
| A6= | −3.78021E−02 | 2.97146E−03 | −7.34156E−03 | −1.29843E−02 |
| A8= | 5.77965E−03 | −4.48603E−03 | −2.58730E−04 | 9.14756E−04 |
| A10= | 1.82115E−02 | 2.25136E−03 | −2.87316E−04 | — |
| A12= | −5.55989E−03 | — | — | — |

Figure 7:
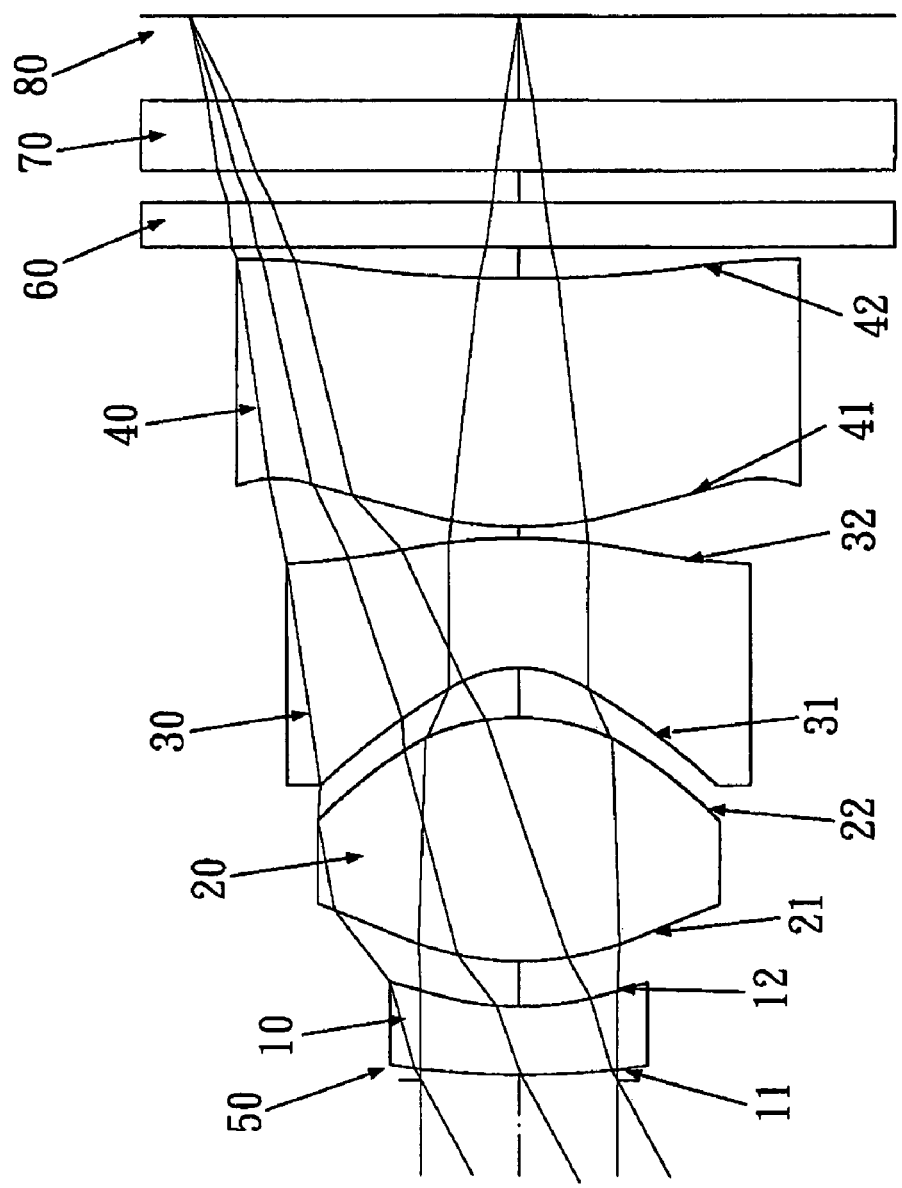
FIG. 7 shows an optical lens system for taking image in accordance with a fourth embodiment of the present invention.
Figure 8:
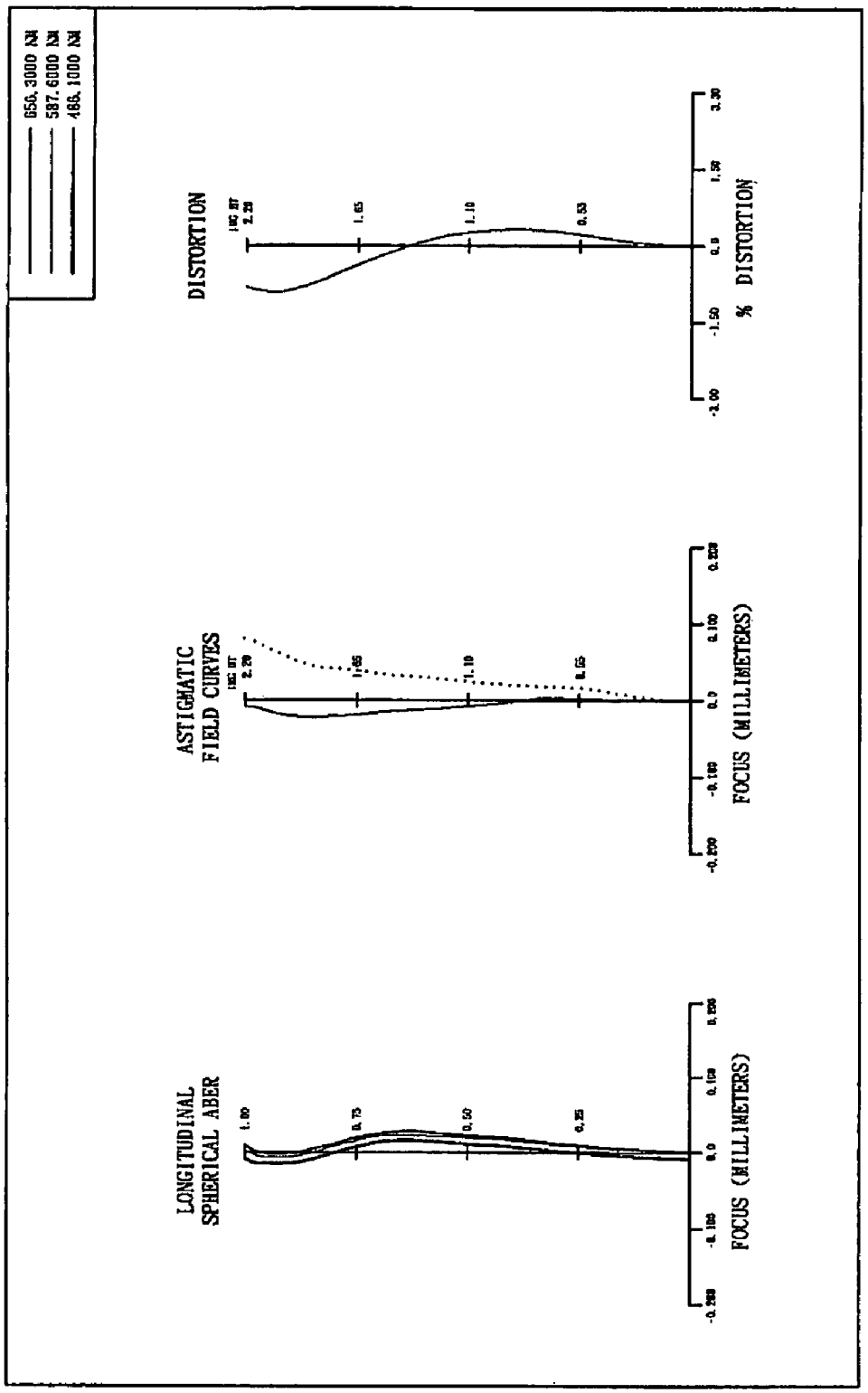
FIG. 8 shows the aberration curve of the fourth embodiment of the present invention.

Referring to FIG. 7, which shows an optical lens system for taking image in accordance with a fourth embodiment of the present invention, and FIG. 8 shows the aberration curve of the fourth embodiment of the present invention. The fourth embodiment of the present invention is an optical lens system for taking image comprising four lens elements with refractive power, and the optical lens system for taking image comprises: from the object side to the image side:

A plastic first lens element 10 with negative refractive power has a convex object-side surface 11 and a concave image-side surface 12, and the object-side surface 11 and the image-side surface 12 of the first lens element 10 are aspheric.

A plastic second lens element 20 with positive refractive power has a convex object-side surface 21 and a convex image-side surface 22, the object-side surface 21 and the image-side surface 22 of the second lens element 20 are aspheric.

A plastic third lens element 30 with negative refractive power has a concave object-side surface 31 and a convex image-side surface 32, the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on each of the object-side surface 41 and the image-side surface 42.

An aperture stop 50 is located in front of the first lens element 10.

An IR cut filter 60 is located behind the fourth lens element 40 and has no influence on the focal length of the optical lens system.

A sensor cover glass 70 is located behind the IR cut filter 60 and has no influence on the focal length of the optical lens system.

An image plane 80 is located behind the sensor cover glass 70.

The equation of the curve of the aspheric surfaces of the fourth embodiment is the same as that of the first embodiment.

In the fourth embodiment of the present optical lens system for taking image, the Abbe number of the first lens element is V1, the Abbe number of the third lens element is V3, and they satisfy the relations:

$$V3 = 30.2$$

$$|V1 - V3| = 30.1.$$

In the fourth embodiment of the present optical lens system for taking image, the focal length of the first lens element is f1, the focal length of the second lens element is f2, the focal length of the third lens element is f3, the focal length of the optical lens system for taking image is f, and they satisfy the relations:

$$f/f1 = -0.58$$

$$f/f2 = 2.46$$

$$f/f3 = -2.23.$$

In the fourth embodiment of the present optical lens system for taking image, the center thickness of the second lens element is CT2, the edge thickness of the second lens element is ET2, and they satisfy the relation:

$$CT2/ET2 = 2.68.$$

The definition of the edge thickness of the fourth embodiment is the same as that of the first embodiment.

In the fourth embodiment of the present optical lens system for taking image, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, and they satisfy the relations:

$$R3/R4 = -1.39$$

$$R5/R6 = 0.26.$$

The detailed optical data of the fourth embodiment is shown in table 7, and the aspheric surface data is shown in table 8, wherein the units of the radius of curvature, the thickness and the focal length are expressed in mm, and HFOV is half of the maximal field of view.

TABLE 7

(Embodiment 2)
f(focal length) = 3.88 mm, Fno = 2.8, HFOV (half of field of view) = 29.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.023 | | | | |
| 2 | Lens 1 | 2.77018(ASP) | 0.450 | Plastic | 1.543 | 60.3 | −6.62 |
| 3 | | 1.47571(ASP) | 0.315 | | | | |
| 4 | Lens 2 | 1.63115(ASP) | 1.600 | Plastic | 1.543 | 60.3 | 1.57 |
| 5 | | −1.17569(ASP) | 0.311 | | | | |
| 6 | Lens 3 | −0.60742(ASP) | 0.844 | Plastic | 1.583 | 30.2 | −1.73 |
| 7 | | −2.30829(ASP) | 0.070 | | | | |
| 8 | Lens 4 | 2.06716(ASP) | 1.600 | Plastic | 1.530 | 55.8 | 4.61 |
| 9 | | 9.78910(ASP) | 0.200 | | | | |
| 10 | IR-filter | Plano | 0.300 | Glass | 1.517 | 64.1 | — |
| 11 | | Plano | 0.200 | | | | |
| 12 | Cover Glass | Plano | 0.460 | Glass | 1.517 | 64.1 | — |
| 13 | | Plano | 0.544 | | | | |
| 14 | Image | Plano | | | | | |

TABLE 8

Aspheric Coefficients

| Surface # | 2 | 3 | 4 | 5 |
|---|---|---|---|---|
| K= | −2.37038E+01 | −7.47166E+00 | −3.73352E+00 | −7.94688E−01 |
| A4= | 1.47536E−02 | −1.84773E−03 | −2.92589E−02 | 4.70838E−02 |
| A6= | −6.60910E−02 | −4.46794E−02 | 3.66751E−02 | 9.23417E−03 |
| A8= | 1.34208E−01 | 8.63422E−02 | −4.30011E−02 | −1.45041E−02 |
| A10= | −1.23247E−01 | −5.49140E−02 | 2.309245E−02 | 4.71118E−03 |
| A12= | — | — | −4.24698E−03 | — |

| Surface # | 6 | 7 | 8 | 9 |
|---|---|---|---|---|
| K= | −1.64956E+00 | −4.68960E+00 | −6.79110E+00 | 1.93021E+01 |
| A4= | 1.23117E−01 | 7.56804E−02 | 1.68079E−04 | 8.49490E−03 |
| A6= | −5.30891E−02 | −2.31918E−02 | −6.86250E−03 | −6.94995E−03 |
| A8= | −1.07191E−04 | 6.67447E−03 | 1.76015E−03 | 6.35681E−04 |
| A10= | 1.17912E−02 | −1.33137E−03 | −3.60373E−04 | — |

TABLE 9

|  | Embodiment 1 | Embodiment 2 | Embodiment 3 | Embodiment 4 |
|---|---|---|---|---|
| f | 3.80 | 3.78 | 3.80 | 3.88 |
| Fno | 2.80 | 2.80 | 2.80 | 2.80 |
| HFOV | 30.0 | 29.9 | 30.0 | 29.7 |
| V3 | 30.2 | 23.4 | 30.2 | 30.2 |
| |V1−V3| | 25.6 | 32.4 | 30.1 | 30.1 |
| f/f1 | −0.21 | −0.14 | −0.01 | −0.58 |
| f/f2 | 2.05 | 1.77 | 2.10 | 2.46 |
| f/f3 | −2.31 | −1.68 | −2.22 | −2.23 |
| CT2/ET2 | 2.08 | 2.21 | 2.13 | 2.68 |
| R3/R4 | −1.38 | −1.53 | −1.46 | −1.39 |
| R3/R4 | 0.24 | 0.34 | 0.27 | 0.26 |

It is to be noted that the tables 1-8 show different data of the different embodiments, however, the data of the different embodiments is obtained from experiments. Therefore, any product of the same structure is contemplated to be within the scope of the present invention even if it uses different data. Table 9 is the data relevant to the respective embodiments of the present invention.

While we have shown and described various embodiments in accordance with the present invention, it is clear to those skilled in the art that further embodiments may be made without departing from the scope of the present invention.

What is claimed is:

1. An optical lens system for taking image comprising four lens elements with refractive power, from the object side to the image side:
    a first lens element with negative refractive power having a concave object-side surface and a convex image-side surface;
    a second lens element with positive refractive power having a convex object-side and a convex image-side surface;
    a third lens element with negative refractive power having a concave object-side surface and a convex image-side surface, the object-side surface and the image-side surface of the third lens element being aspheric;
    a fourth lens element with positive refractive power having a convex object-side surface and a concave image-side surface, the object-side surface and the image-side surface of the fourth lens element being aspheric; and
    an aperture stop located between the object and the second lens element;
    wherein an Abbe number of the first lens element is V1, an Abbe number of the third lens element is V3, and they satisfy the relation:

$|V1-V3|>3$.

2. The optical lens system for taking image as claimed in claim 1, wherein the third lens and the fourth lens element are made of plastic material, and at least one inflection point is formed on the fourth lens element.

3. The optical lens system for taking image as claimed in claim 2, wherein the first lens element is made of plastic material, and the image-side and object-side surfaces of the first lens element are aspheric.

4. The optical lens system for taking image as claimed in claim 2, wherein the second lens element is made of plastic material, and the image-side and object-side surfaces of the second lens element are aspheric.

5. The optical lens system for taking image as claimed in claim 1, wherein the Abbe number of the first lens element is V1, the Abbe number of the third lens element is V3, and they satisfy the relation:

$|V1-V3|>15$.

6. The optical lens system for taking image as claimed in claim 5, wherein the Abbe number of the third lens element is V3, and it satisfies the relation: V3<32.

7. The optical lens system for taking image as claimed in claim 6, wherein the Abbe number of the third lens element is V3, and it satisfies the relation: V3<28.

8. The optical lens system for taking image as claimed in claim 7, wherein the Abbe number of the third lens element is V3, and it satisfies the relation: V3<25.

9. The optical lens system for taking image as claimed in claim 5, wherein a focal length of the second lens element is f2, a focal length of the optical lens system for taking image is f, and they satisfy the relation:

$1.65<f/f2<2.2$.

10. The optical lens system for taking image as claimed in claim 9, wherein a focal length of the first lens element is f1, the focal length of the optical lens system for taking image is f, and they satisfy the relation:

$$-0.5 < f/f1 < -0.1$$

11. The optical lens system for taking image as claimed in claim 9, wherein a center thickness of the second lens element is CT2, an edge thickness of the second lens element is ET2, and they satisfy the relation:

$$2.0 < CT2/ET2 < 2.5.$$

12. The optical lens system for taking image as claimed in claim 9, wherein a radius of curvature of the object-side surface of the second lens element is R3, a radius of curvature of the image-side surface of the second lens element is R4, a radius of curvature of the object-side surface of the third lens element is R5, a radius of curvature of the image-side surface of the third lens element is R6, and they satisfy the relations:

$$-2.0 < R3/R4 < -1.0$$

$$0.2 < R5/R6 < 0.4.$$

13. The optical lens system for taking image as claimed in claim 1, wherein the aperture stop is located in front of the first lens element.

14. The optical lens system for taking image as claimed in claim 13, wherein a focal length of the third lens element is f3, the focal length of the optical lens system for taking image is f, and they satisfy the relation:

$$-1.8 < f/f3 < -1.6.$$

* * * * *